Jan. 10, 1933.  W. OLSON  1,894,192
LANDING NET
Filed June 2, 1931

WITNESSES
Jos. L. Lamia
Hugh N. Ott

INVENTOR
William Olson
BY
Munn & Co.
ATTORNEYS

Patented Jan. 10, 1933

1,894,192

UNITED STATES PATENT OFFICE

WILLIAM OLSON, OF BROOKLYN, NEW YORK, ASSIGNOR TO OLSON BROS. SAW MANUFACTURING CO., INC., OF BROOKLYN, NEW YORK, A CORPORATION OF NEW YORK

LANDING NET

Application filed June 2, 1931. Serial No. 541,642.

This invention relates to landing nets for anglers, and comprehends an improved net structure which is primarily designed with a view of rendering the same capable of being conveniently carried and used by an angler when wading or walking, although the same may also be used for boat or shore fishing.

While it is appreciated that other landing nets have been devised in which the handle or net frame is associated for relative adjustment to reduce the overall length, the present invention aims to provide a landing net which is so constructed as to facilitate its suspension while in a contracted condition, from the garment of an angler while wading or walking, whereby it will not interfere with or hamper his movements and at the same time be ready for instant extension to an active position for netting and landing a fish.

More particularly, the invention resides in an improved landing net in which a handle having a garment engaging suspension clip at its inner end, is provided, and with which the net frame is slidably associated in such a manner that the inner side of the net frame rests by gravity on said inner end of the handle, which inner end is disposed uppermost when in suspended position, or with the free opposite lowermost end of the handle protruding, whereby it may be readily grasped for whipping the net frame by centrifugal force to an extended active position for use in landing a fish.

The invention further aims to provide cooperative resilient gripping portions of the net frame which automatically engage with and temporarily effect frictional retention of the net frame in its extended active position when whipped outwardly, thereby permitting the net to be manipulated with one hand.

As a further feature, the invention embodies a guide sleeve for the handle secured to and carried by the net frame and provided with a detent with which the clip may be manually engaged when it is desired to obtain a more or less permanent extended active relation of the handle or frame for boat or shore fishing.

The invention further resides in a net structure which embodies but few and simple parts, capable of economical production and assembly and providing a net structure which is strong, durable and efficient.

With the above recited and other objects in view, reference is had to the following description and accompanying drawing, in which there is exhibited one example or embodiment of the invention, while the claims define the actual scope of the same.

Figure 1:
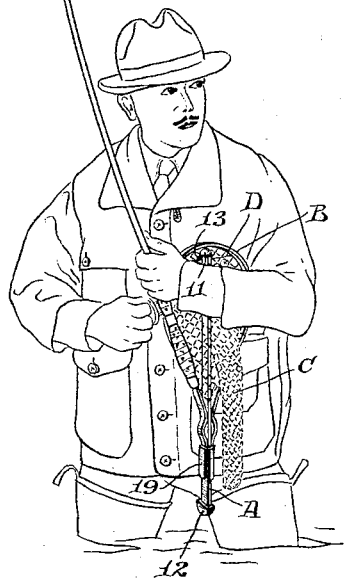
Figure 1 is a view illustrating the net in its collapsed or folded inactive position suspended from the garment of an angler.

Referring to the drawing by characters of reference, A designates generally the handle which includes a shank 10, preferably constructed of a tubular light-weight material, such as aluminum, and which is preferably of rectangular cross sectional configuration. The handle further includes an enlarged head or cap piece 11 at its inner end and a similar enlarged head or cap piece 12 at its outer end. A spring clip 13 is secured to and carried by the inner end, and said clip serves primarily as a means for suspending the handle from a pocket or other portion of the garment of an angler, in addition to functioning in another capacity which will be hereinafter set forth.

The net structure further includes a net frame designated generally by the reference character B, with which the usual net fabric or mesh C is associated. The net frame is fashioned from suitably resilient strap material 15, which is bent or bowed in substantially ring form with the ends 16 secured in spaced parallel relation, preferably by riveting the same as at 17 within the laterally offset sides 18 of a tubular guide 19 which is of cross sectional size and shape to snugly receive therethrough the shank 10 of the handle A. Between the secured portions of the ends 16 and the ring or band portion of the net frame B, the strap material of the frame is formed with inwardly curved offset frictional gripping portions or jaws 20 which are normally spaced apart a distance less than the width of the inner head 11 of the handle A. The length of the handle A is such that when it is moved inwardly to contract the overall length of the net, the inner head 11 will engage with the inner surface of the net frame while the outer end of the handle A will protrude a sufficient distance beyond the outer end of the sleeve 19 to afford a grasping portion.

Figure 5:
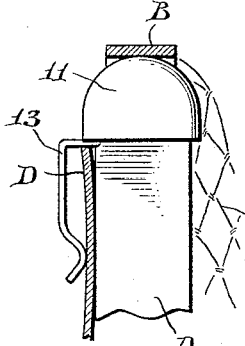
Figure 5 is a fragmentary enlarged view illustrating the manner in which the suspension clip engages with the garment.
Figure 4:
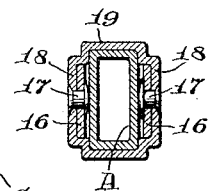
Figure 4 is a transverse sectional view taken approximately on the line 4—4 of Figure 3.
Figure 2:
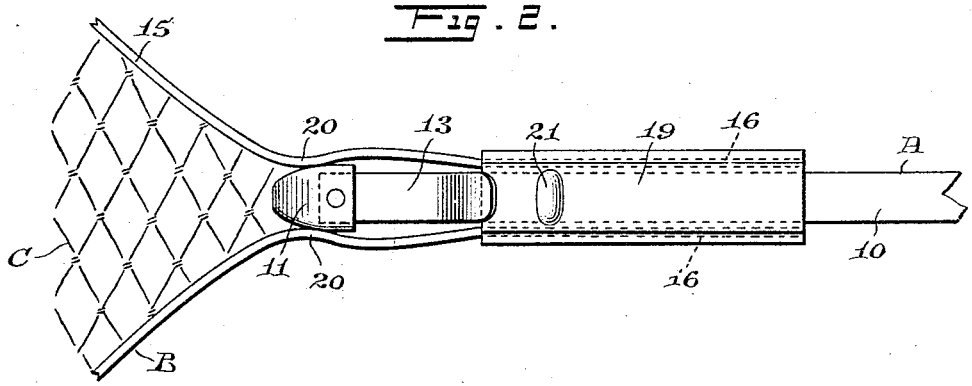
Figure 2 is a fragmentary plan view illustrating the net frame and handle in temporarily frictionally locked extended relation.

In use, when the net is to be carried by an angler when wading or walking, the suspension clip 13 is suitably engaged over the edge of a pocket D or other portion of a garment, as clearly illustrated in Figures 1 and 5. The inner head 11 is disposed uppermost and the net frame gravitates to the position illustrated in Figure 1, where the inner surface of the frame rests upon the innermost or uppermost head 11 of the handle. When the angler has hooked and played a fish and is ready to land it, he has only to grasp the protruding lowermost end of the handle A and whip or snap the frame outwardly by centrifugal force, thereby extending the net frame on the handle and driving the inwardly offset gripping portions or jaws 20 into frictional engagement with the head 11. This temporarily retains the net frame and handle in their extended active relation for netting and landing the fish. After this has been accomplished, the net frame and handle may again be contracted by forcing the handle inwardly.

Figure 3:
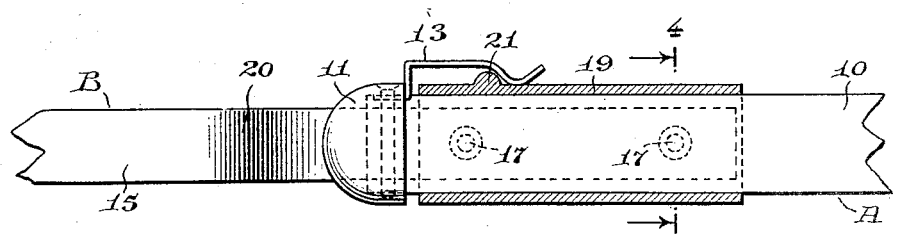
Figure 3 is a fragmentary longitudinal sectional view illustrating the net frame and handle in permanently locked extended relation.

If it is desired to more or less permanently extend and retain the handle and net frame in extended active relation for boat or shore fishing, the handle is pulled outwardly with respect to the net frame to the position illustrated in Figure 3 and the clip 13 springs over a detent bead 21 which is formed on the sleeve 19.

From the foregoing, it will thus be seen that an all-purpose landing net has been devised which is particularly adaptable and convenient for the use of an angler when wading or walking, in that its overall length may be shortened so as not to hamper his movements in casting or playing a fish while the net is ready to be brought into instant use with one hand. It is further apparent that the net when in its collapsed folded condition occupies a lesser amount of space for storage or transportation.

While there has been illustrated and described a single and preferred embodiment of the invention, no limitation is intended to the precise structural details herein exhibited, and variations and modifications thereof which fall within the scope of the claims are reserved.

What is claimed is:

1. In a landing net, a handle having an enlarged head at its inner end, a net frame, a slidable connection therebetween to permit of relative movement thereof respectively to retracted or extended relations and integral portions of the net frame operable to frictionally grip the head at the inner end of the handle when the frame and handle are in extended relation.

2. A landing net comprising in combination a net frame fashioned from a length of resilient strap material bent into substantially ring form with spaced parallel ends projecting therefrom, a sleeve secured to the terminals of said ends, the remaining unsecured portions of said ends between the sleeve and the ring portion of the net frame being offset inwardly to provide frictional gripping portions and a handle slidable in the sleeve and having an enlarged head at its inner end frictionally engageable by said inwardly offset portions upon outward movement of the net frame and handle.

3. A landing net including a net frame formed with a tubular handle guide projecting outwardly therefrom, a handle slidable through the guide to extend it in retracted positions, the inner end of the handle when retracted engageable with the inner surface of the net frame and limiting the retracted movement for disposing a sufficient length of the handle beyond the guide to facilitate the grasping thereof.

4. A landing net including a handle having a headed inner end provided with a garment engaging suspension clip and a net frame having slidable connection with the handle for gravitation of the net frame to a contracted position with reference to the handle, when said handle is suspended by the clip, whereby the inner surface of the frame rests upon the headed inner end of the handle with the major portion of the handle disposed within the confines of the net frame.

5. A landing net including a handle having a headed inner end provided with a garment engaging suspension clip and a net frame having slidable connection with the handle for gravitation of the net frame to a contracted position with reference to the handle, when said handle is suspended by the clip, whereby the inner surface of the frame rests upon the headed inner end of the handle with the major portion of the handle disposed within the confines of the net frame and with a portion of the outer end of the handle exposed to be grasped for whipping the net frame to an extended active relation to the handle by centrifugal force.

6. A landing net including a handle having a headed inner end provided with a garment engaging suspension clip and a net frame having slidable connection with the handle for gravitation of the net frame to a contracted position with reference to the handle, when said handle is suspended by the clip, whereby the inner surface of the frame rests upon the headed inner end of the handle with the major portion of the handle disposed within the confines of the net frame and with a portion of the outer end of the handle exposed to be grasped for whipping the net frame to an extended active relation to the handle by centrifugal force, said net frame having cooperative portions for frictional engagement with the headed inner end of the net frame when said frame is moved outwardly on said handle.

7. A landing net comprising in combination a net frame fashioned from a length of resilient strap material bent into substantially ring form with spaced parallel ends projecting therefrom, a sleeve secured to the terminals of said ends, the remaining unsecured portions of said ends between the sleeve and the ring portion of the net frame being offset inwardly to provide frictional gripping portions and a handle slidable in the sleeve and having an enlarged head at its inner end frictionally engageable by said inwardly offset portions upon outward movement of the net frame and handle and a spring clip at the inner end of said handle constituting respectively a garment engaging clip for suspending the net when the frame and handle are contracted and serving as a means for engaging the sleeve to retain the handle and frame in extended relation.

8. A landing net comprising in combination a net frame fashioned from a length of resilient strap material bent into substantially ring form with spaced parallel ends projecting therefrom, a sleeve secured to the terminals of said ends, the remaining unsecured portions of said ends between the sleeve and the ring portion of the net frame being offset inwardly to provide frictional gripping portions and a handle slidable in the sleeve and having an enlarged head at its inner end frictionally engageable by said inwardly offset portions upon outward movement of the net frame and handle, a spring clip at the inner end of said handle constituting respectively a garment engaging clip for suspending the net when the frame and handle are contracted and serving as a means for engaging the sleeve to retain the handle and frame in extended relation and detent means on the sleeve with which said clip is engageable.

9. In a landing net, a net frame having a guide protruding from one end thereof, a handle slidable through said guide and a spring clip at the inner end of said handle for constituting means for respectively suspending the net when in contracted condition and for engaging with the guide to hold the net extended.

WILLIAM OLSON.